W. W. CRANE.

Self-Lubricating Journal-Boxes.

No. 5,170. Reissued Dec. 3, 1872.

Witness:
Jas. E. Hutchinson
C. L. Emerson

Inventor.
Wellsby W. Crane
per
Brandenburg
Attorneys.

UNITED STATES PATENT OFFICE.

WELLSLY W. CRANE, OF AUBURN, NEW YORK.

IMPROVEMENT IN SELF-LUBRICATING JOURNAL-BOXES.

Specification forming part of Letters Patent No. 77,261, dated April 28, 1868; reissue No. 5,170, dated December 3, 1872.

*To all whom it may concern:*

Be it known that I, WELLSLY W. CRANE, of the city of Auburn, in the county of Cayuga and State of New York, have invented certain new and useful Improvements in Self-Lubricating Boxes for Shafting; and I do hereby declare the following to be a full, clear, and exact description thereof, reference being had to the accompanying drawing and to the letters of reference marked thereon.

The nature of my invention consists in the construction and arrangement of a self-lubricating box for shafting, for conducting the oil on and around the shaft and returning the oil back into the receiver without loss by leakage, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1:
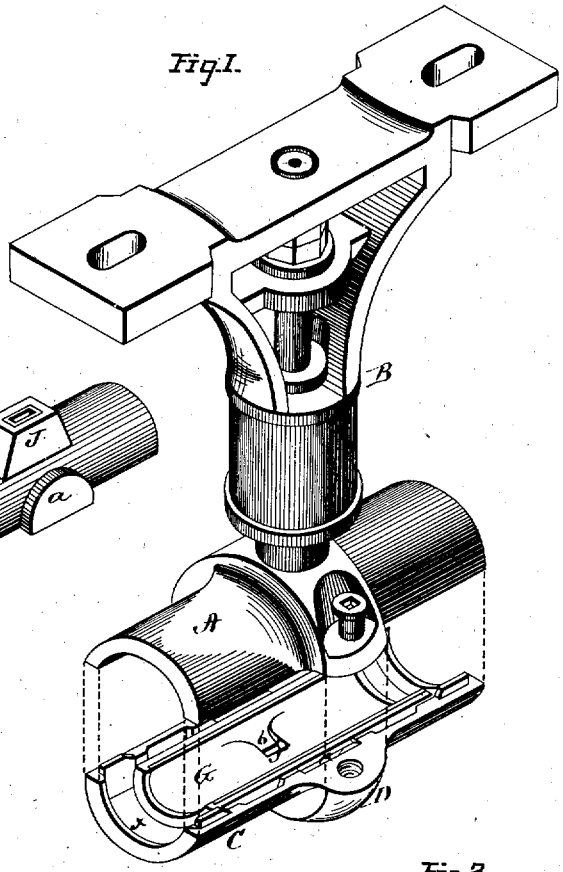
Figure 4:
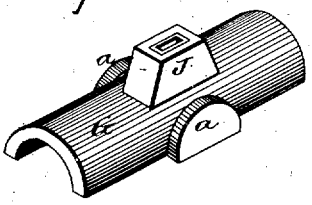
Figure 5:
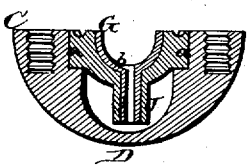
Figure 2:
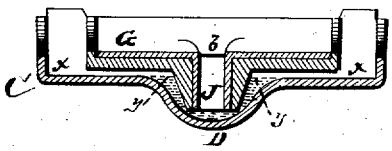

Figure 1 is a perspective view of my entire box with the lower part detached; Fig. 2 is a longitudinal vertical section; Fig. 3 is a transverse vertical section of the lower part of the box; and Fig. 4 is an inverted perspective view of said lower part of the box.

A represents the upper half of the box, with a hanger, B, of any suitable construction. C represents the lower half of the box, with an oil-chamber, D, in the center; the whole forming the oil-receiver. In the center of the sides of the section C are formed suitable bearings for the trunnions *a a* formed upon the sides of the bearing G in which the shaft rests. The bearing G is constructed, as shown, with a depending tube, J, in the center, extending downward into the oil-chamber D, and in the bottom of the bearing, on one side of the tube J, is formed a depression, receptacle, or channel, *b*, as shown in Fig. 1. The entire box or bearing G, with the tube J, may be lined on the inside with soft or Babbitt metal, as shown in the drawing; but when the box is bored out to fit the shaft then such lining is dispensed with, as this lining is only used to make the box air-tight. The openings at the ends of the external box are made of larger diameter than those in the shaft-bearing G for the purpose of allowing said bearing to adjust itself to the shaft. The lower section or oil-receiver C D is secured to the upper section by screws or other suitable means, and when said receiver is filled with a lubricating fluid, so as not to run over at its ends, the fluid will stand some distance below the top of the tube J, said tube extending nearly to the bottom of the chamber.

When the shaft is put in motion the air contained in the upper part of the tube J will be drawn out through the recess or channel *b*, and thus a vacuum formed in the tube between the oil and the shaft above. The atmospheric pressure upon the surface of the oil in the receiver or lower section of the box will cause a continual flow of oil to pass through the tube J and upon and around the shaft and shaft-bearing, and return back over the side and ends of the bearing-box G into the receiver or lower section C D. The external box is made of sufficient length beyond the bearing G to receive and retain all the surplus oil within the receiver or lower section, so that the oil will be returned and taken up by the tube J and used again and again until the whole of the lubricating qualities of the oil are absorbed.

It will be seen that the bearing G is provided with semicircular-shaped trunnions *a a*, and that the box C has corresponding recesses for the perfect fitting of the trunnions therein. These recesses are so formed that when the bearing and its trunnions are fitted to the box the ends of the bearing G are slightly above the ends of the box C. By this means, should the beam to which the hanger is attached deflect or twist, the bearing is allowed to vibrate slightly on its trunnions—hence, accommodate itself to the shaft.

In Fig. 2, *y* represents the height of oil in the chamber D, and *x x* represent small chambers formed by the construction of the box, and by which means the oil is conducted back into the reservoir after having been sucked up by the revolution of the shaft.

In operation, the depression *b*, at one side of the oil-channel, in the bearing, forms an essential feature of my invention. As the shaft revolves in its forward course the air is drawn out through the channel, a vacuum is created, and the oil freely flows up to the shaft, and in time flows over the sides and ends of the bearing and back to the oil-chamber. Should the shaft be reversed, no oil will pass up the channel.

Having thus fully described my invention, what I claim as new, and desire to secure by Letters Patent, is—

1. In combination with a journal-box provided with an oil-chamber, a shaft-bearing provided with a flaring depression, *b*, at one side of the slot, substantially as and for the purposes herein set forth.

2. The combination of a journal-box, C, with an oil-chamber, D, a shaft-bearing, G, with a depending tube, J, and a flaring depression, *b*, at one side of the mouth of the tube, substantially as and for the purposes herein set forth.

3. The shaft-bearing G and depending tube J, provided with a facing of Babbitt or equivalent soft metal, which extends down into and forms a lining for the walls of the tube, substantially as herein set forth.

In testimony that I claim the foregoing I have hereunto set my hand this 20th day of November, 1872.

W. W. CRANE.

Witnesses:
EDM. F. BROWN,
C. L. EVERT.